(12) United States Patent
Liu

(10) Patent No.: US 8,978,575 B2
(45) Date of Patent: Mar. 17, 2015

(54) PRINTS WITH TEMPERATURE HISTORY TRACKING CAPABILITY

(75) Inventor: Chu-Heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 154 days.

(21) Appl. No.: 13/416,499

(22) Filed: Mar. 9, 2012

(65) Prior Publication Data

US 2013/0235112 A1 Sep. 12, 2013

(51) Int. Cl.
*G01K 1/02* (2006.01)
*G01K 11/06* (2006.01)

(52) U.S. Cl.
CPC ..................... *G01K 11/06* (2013.01)
USPC ........................................... 116/217

(58) Field of Classification Search
CPC ..................................... G01K 11/06

USPC ........................................... 116/217
See application file for complete search history.

(56) References Cited

U.S. PATENT DOCUMENTS

| 2,955,942 | A * | 10/1960 | Fenity et al. | 116/201 |
| 7,036,452 | B1 * | 5/2006 | Tester | 116/207 |
| 2003/0024465 | A1 * | 2/2003 | Perner et al. | 116/217 |
| 2009/0050049 | A1 * | 2/2009 | Craig et al. | 116/217 |
| 2011/0048312 | A1 * | 3/2011 | LeFevre et al. | 116/216 |

* cited by examiner

*Primary Examiner* — Julian Huffman
(74) *Attorney, Agent, or Firm* — MH2 Technology Law Group LLP

(57) ABSTRACT

In some aspects of the present application, a method is disclosed that can include determining a change in state of an ink printed on a label; and determining a change in temperature to which the label has been exposed to based on the change in state of the ink.

11 Claims, 5 Drawing Sheets

FRONT SIDE (VIEWING SIDE)

BACK SIDE (PRINTING SIDE)
ORIGINAL SAMPLE

FRONT SIDE (VIEWING SIDE)

BACK SIDE (PRINTING SIDE)
DAMAGED SAMPLE
(OVER HEATED)

PRINTS WITH TEMPERATURE HISTORY TRACKING CAPABILITY

FIELD OF THE DISCLOSURE

The present application is directed to temperature tracking of products, and more particularly to a method and apparatus for temperature tracking of products using inks with a known temperature profile.

BACKGROUND OF THE DISCLOSURE

Environmental conditions such as temperature can have an adverse impact on certain goods and/or products. For example, certain goods and/or products may degrade or become unusable if exposed to temperatures above or below which the goods and/or products are normally expected to experience, if the exposure at these temperatures becomes prolonged, then the goods and/or products may be harmful to the intended user of those goods and/or products. For example, exposure of medication to prolonged temperatures may render those medications ineffective, which may put the intended user in danger. Conventional temperature tracking of goods has not solved the need for a user to be informed as to whether and to what extent the goods and/or products may have been exposed to undesired temperatures or fluctuations in temperature. Thus, an improved temperature tracking system and method is needed.

SUMMARY OF THE DISCLOSURE

In accordance with some aspects of the present disclosure, a method is disclosed. The method can include determining a change in state of an ink printed on a label; and determining a change in temperature to which the label has been exposed based on the change in state of the ink.

In some aspects, the change of state can comprise a change in appearance of the ink. The change in appearance can comprise a change in color or quality of the ink image.

In some aspects, the method can comprise printing the ink onto the label.

In some aspects, the change in state can comprise a change of a portion of the ink melting due to exposure to a temperature above a predetermined temperature threshold.

In some aspects, the method can comprise affixing the label onto a package containing one or more items that are temperature-sensitive.

In some aspects, the items can comprise food or pharmaceutical products

In some aspects, the printing can be performed at an elevated temperature above a melting point of the ink.

In some aspects, the ink can comprise a wax or resin.

In some aspects, the label can comprise a substrate on which the ink is printed, wherein the substrate comprises an uncoated surface, a coated surface, a porous surface, or a non-porous surface.

In accordance with some aspects of the present disclosure, a print device is disclosed that can comprise one or more reservoirs operable to store one or more inks having a predetermined temperature related quality profile; one or more print nozzles coupled to the one or more reservoirs operable to receive the one or more inks to be printed onto a label; and a controller operable to control an amount of ink dispensed through the one or more print nozzles based on a temperature range at which the label is intended to be exposed.

In some aspects, the temperature related quality profile can include a change of state or a change in appearance of the one or more ink images.

In some aspects, the change in appearance can comprise a change in color or quality of the one or more ink images.

In some aspects, the controller can be operable to instruct the print nozzles to print the one or more inks onto the label.

In some aspects, the change in state can comprise a change of a portion of the one or more inks melting due to exposure to a temperature above a predetermined temperature threshold.

In some aspects, the controller can be operable to affix the label onto a package containing one or more items that are temperature-sensitive.

In some aspects, the items can comprise food or pharmaceutical products.

In some aspects, the dispensing of the one or more inks can be performed at an elevated temperature above a melting point of the ink.

In some aspects, the ink can comprise a wax or resin.

In some aspects, the label can comprise a substrate on which the ink is printed, wherein the substrate comprises an uncoated surface, a coated surface, a porous surface, or a non-porous surface.

Additional embodiments and advantages of the disclosure will be set forth in part in the description which follows, and can be learned by practice of the disclosure. The embodiments and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments of the disclosure and, together with the description, serve to explain the principles of the disclosure.

DESCRIPTION OF THE EMBODIMENTS

Figure 1A:
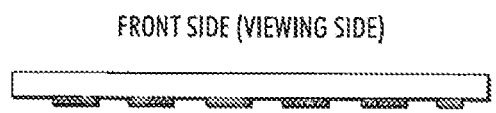
FIGS. 1a-1d show an example embodiment of the temperature tracking and printing process in accordance with aspects of the present disclosure where show through (ink moves into paper when subject to high temperatures and consequently the ink image becomes visible from the back side of the substrate) can occur.

Reference will now be made in detail to various exemplary embodiments of the present application, examples of which are illustrated in the accompanying drawings. Wherever possible, the same reference numbers will be used throughout the drawings to refer to the same or like parts.

Solid ink printing jets ink at elevated temperatures above the melting point of the wax/resin of the ink where ink drops solidify when they contact the substrate. When solid ink prints are heated again, a number of problems can occur. Typically, ink has a blocking temperature that is below the melting point, and the ink tends to soften and become sticky when the temperature is above the blocking temperature. When the ink is pressed against another substrate surface or another ink surface for some extended time the ink tends to stick to the surface causing ink offset when the surfaces are separated.

As the ink temperature increases further such that it approaches the melting point, the ink tends to become a low viscosity fluid. When an image is re-heated to above the melting point, a number of "undesired" effects can happen to the image. For example, one undesired effect can be how-through. For porous substrates, the melted ink tends to penetrate into the bulk of the substrate and the image will be more and more visible from the backside of the print. For un-coated substrates, this process happens very quickly. For coated substrates, it happens rather slowly. Another undesired effect can be image degradation from the front side. For porous substrates, as the ink flows into the substrate, the front image will fade/change in color/density and degrade with significant image noise. Some fine/subtle feature will disappear. Another process associated with the re-melting is the coalescence of the ink drops, which cause the colors of adjacent drops to diffuse into each other. Although it occurs at a microscopic scale, it can be made visible with color images. For non-porous substrate, the wetting/de-wetting of the ink drops on the substrate will cause the dot/line edges to move and also cause the color/density to change.

Depending on the temperature, substrate and the materials properties, the above mentioned processes can take a fraction of a second (show-through on un-coated substrate above melting point) to hours and days (offset due to blocking) to cause significant image change.

In accordance with aspects of the present disclosure, the image change/degradation associated with solid ink image reheating/re-melt can be used as a mechanism to track the temperature history of the image and the product that this image is attached to by way of direct visual indicators. Packages/labels can be printed using one or more solid inks with a melting point (or blocking temperature) around the targeted maximum allowable temperature of a product (food, pharmaceuticals products etc.). If the package is subjected to temperatures higher than the specified temperature during shipping, storage etc. for sufficient amount of time, the printed image will show irreversible and visible change/degradation. Through the image feature designs, a direct message can be revealed to the customer.

For example, a temperature tracking and printing process can begin with the product temperature requirements, such as maximum temperature and duration, being determined. Products to be tracked can include, for example, food, pharmaceuticals/bio-medical product and other temperature sensitive materials/products. Depending on the customer needs, the temperature tracking image can be printed on the package, on the label, on the insert or on a separate tag. Depending on the temperature/exposure time limit, a combination of ink, substrate and image feature will be chosen to satisfy the requirements.

For example, if indication to a short exposure to a maximum temperature is required, ink can be chosen with desired melting point (slightly lower than the max temperature), uncoated substrate and show-through image feature. Warning messages such as "Void," "Exceeded Storage Temperature" can be printed with mirror reflection on the back side of the substrate. The backside can be covered with an opaque substrate. If the product has been exposed to temperatures above the limit, the customer will see the warning from the front. Otherwise, the message is invisible.

As another example, if track time exposure to med-high temperatures is required, an ink with blocking temperature below this limit and the melting point above this limit can be chosen. Offset type image feature can be used to track the change. As one example of image design to take advantage of the ink offsetting process, a warning message can be split into two parts: one part printed on one side, the other part printed on the other side. Each part separately can be made to be nonsensical; however, when combined, the message can be revealed. By way of a non-limiting example, the word "VOID" can be chosen, where the "V I" can be printed on one side and the mirror image of "O D" can be printed on the other side. The two images may be registered such that when the two images are facing each other, the letters will be interleaved and form the word "VOID," If image offset does not occur, the customer will see two separate parts. If the product exceeds the high temperature exposure limit, the combined warning will be shown.

As another example, the front side can be used for image degradation to track exposure to over melting point for some intermediate time. Coated porous substrates can be used and fine text, such as expiration data, can be printed on it. If over exposure to high temperature occurs, the fine text will slowly degrade and become unreadable.

Figure 1B:
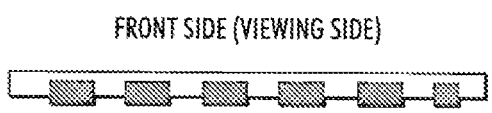
Figure 1C:
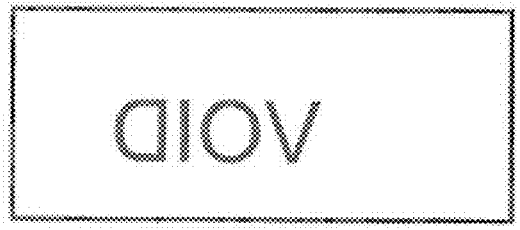
Figure 1D:
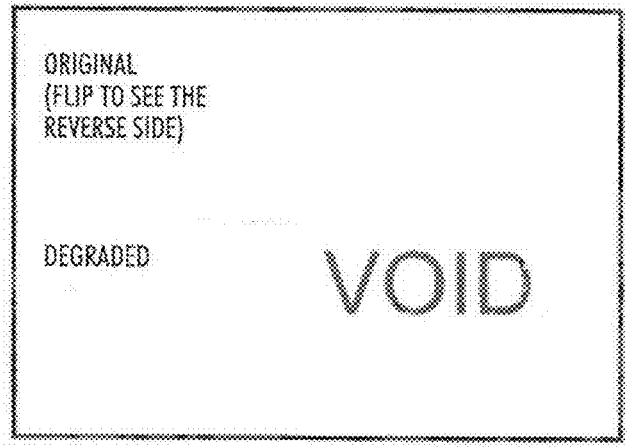

FIGS. 1a-1c show an example embodiment of the temperature tracking and printing process in accordance with aspects of the present disclosure where show through (ink moves into paper when subject to high temperatures) can occur. FIG. 1a shows a front side (viewing side) and a back side (printing side) of original sample. FIG. 1b shows a font side (viewing side) and a back side (printing side) of a damaged or overheated sample. FIG. 1c shows the back side (print side) of the original image. FIG. 1d shows the front side of the un-damaged sample and a damage/degraded sample. The undamaged sample shows a blank area on the viewing side while the damage sample shows the "VOID" message. The degradation can occur on the order of about less than a second, for example in about a fraction of a second, once the temperature is above the melting point of the ink.

Figure 2:
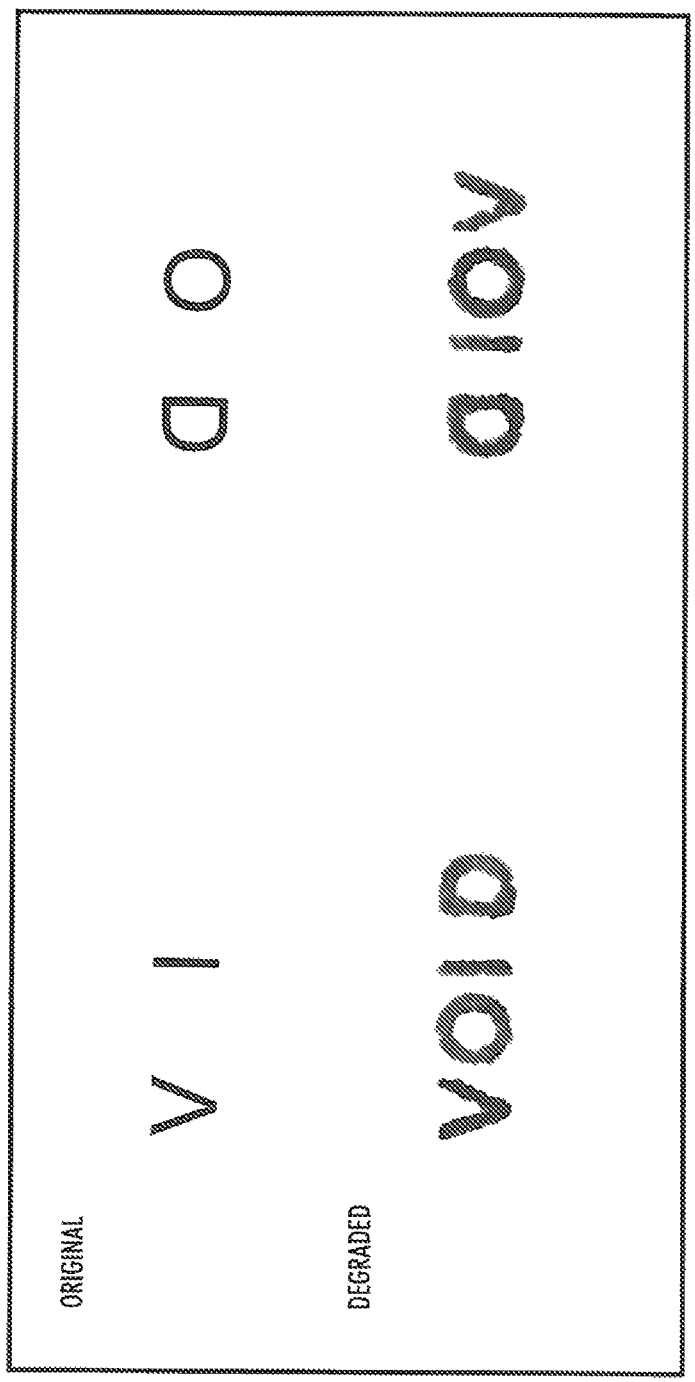
FIG. 2 shows another example embodiment of the temperature tracking and printing process in accordance with aspects of the present disclosure where offset (ink moves away from the paper and offset/transfer to the opposing page) can occur.

FIG. 2 shows another example embodiment of the temperature tracking and printing process in accordance with aspects of the present disclosure where offset (ink moves away from the paper and offset/transfer to the opposing page) can occur. The original sample was folded in the middle first, subject to high temperature, and then unfolded. To enhance the effect of the offset, coated paper is used to reduce the flow of ink into the paper.

Figure 3:
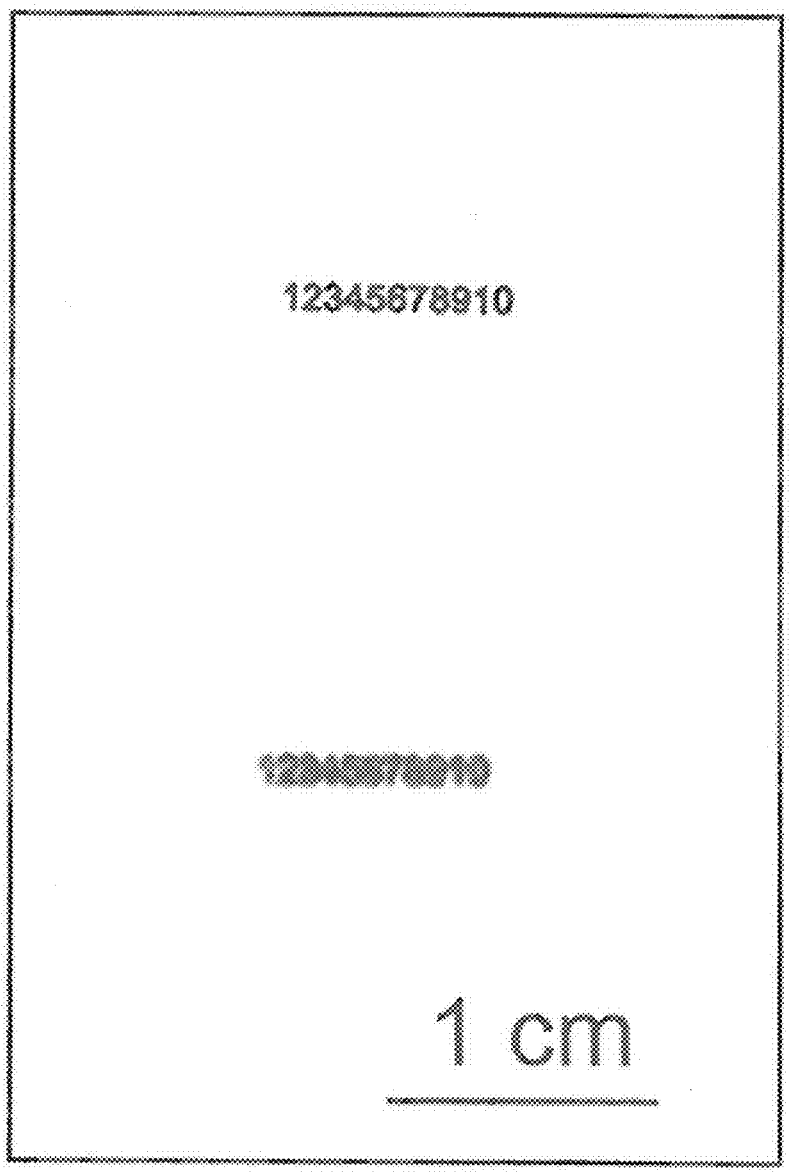
FIG. 3 shows another example embodiment of the temperature tracking and printing process in accordance with aspects of the present disclosure where image smear (ink moves laterally) can occur.

FIG. 3 shows another example embodiment of the temperature tracking and printing process in accordance with aspects of the present disclosure where image smear (ink moves laterally) can occur. For example, very legible small text can be printed and when subjected to high temperature, the image can smear. The degradation can occur over a time frame ranging from minutes to hours when the temperature is above the melting point of the ink.

The ink used in the above examples can include wax, such as polyethylene wax with a molecular weight of around 500 and paraffin wax. The melting point can be lowered by going to lower molecular weight. The ink can be printed on a variety of product, such as food, pharmaceuticals/bio-medical products, and other temperature sensitive materials/products and can be printed in a variety of locations, such as on a package, a label, or an insert. The ink can be printed onto a substrate, depending on the intended image features. The substrate can be uncoated, coated, porous, or a non-porous substrate. The ink can be a solid ink with various colors, melting points and blocking temperatures. The image feature can include show-through (back-side), image degradation/change (front side), offset (facing pages).

Figure 4:
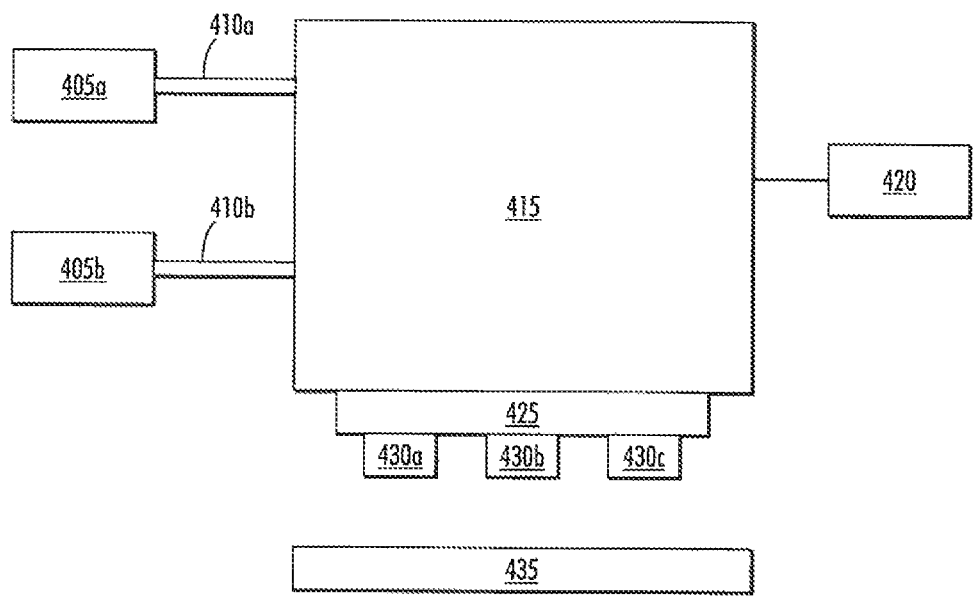
FIG. 4 shows an example printing device in accordance with aspects of the present disclosure.

FIG. 4 shows an example printing device in accordance with aspects of the present disclosure. It should be readily apparent to one of ordinary skill in the art that the printing device depicted in FIG. 4 represents a generalized schematic illustration and that other components/devices can be added, removed, or modified.

FIG. 4 shows an example device where the ink can be printed with one or more inkjet devices including one or more ink reservoirs 405a and 405b arranged to hold the ink and can be coupled to one or more inkjet heads 415 by way of ink flow conduits 410a and 410b arranged to dispense the ink through one or more nozzles 430a, 430b, and 430c. The one or more nozzles 430a, 430b, and 430c can be coupled to the one or more inkjet heads 415 by way of coupling mechanism 425, which can allow nozzles to be added or removed from inkjet head 415. Although FIG. 4 shows two ink reservoirs and three nozzles, this is merely for illustration purposes. Any number of ink reservoirs and nozzles can be used in the printing device. Controller 420 can be coupled to the inkjet heads and can be implemented using any suitable combination of hardware and/or software. In some embodiments, controller may include, for example, a processor, a memory, and software or operating instructions. Processor may include conventional devices, such as a Central Processing Unit (CPU), a microprocessor, a "computer on a chip", a micro controller, etc. Memory may include conventional devices such as Random Access Memory (RAM), Read-Only Memory (ROM), or other storage devices, and may include mass storage, such as a CD-ROM or a hard disk. Controller may be included within, or may include, a computing device such as a personal computer, a desktop computer, a mobile computer, a laptop computer, a server computer, or workstation (and thus part or all of the functionality of controller may be external to the printer system). Controller may be of other configurations, and may include other suitable components.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "an acid" includes two or more different acids. As used herein, the term "include" and its grammatical variants are intended to be non-limiting, such that recitation of items in a list is not to the exclusion of other like items that can be substituted or added to the listed items.

While particular embodiments, have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications, variations, improvements, and substantial equivalents.

What is claimed is:

1. A print device, comprising:
   one or more reservoirs operable to store one or more inks having a predetermined temperature-related quality profile;
   one or more print nozzles coupled to the one or more reservoirs operable to receive the one or more inks to be printed onto a label;
   a controller operable to control an amount of ink dispensed through the one or more print nozzles based on a temperature at which the label is intended to be exposed;
   the label comprises a first side and a second side opposite the first side;
   a first nonsensical ink pattern printed on the first side of the label; and
   a second nonsensical ink pattern printed on the second side of the label, wherein:
     the first and second nonsensical ink patterns are registered to each other;
     the second nonsensical ink pattern is configured such that the second nonsensical ink pattern is not visible from the first side of the label prior to the label reaching the temperature;
     the second nonsensical ink pattern is configured to be visible from the first side of the label subsequent to the label reaching the temperature; and
     the first nonsensical ink pattern and second nonsensical ink pattern are configured to combine and form a readable pattern from the first side of the label subsequent to the label reaching the temperature.

2. The print device according to claim 1, wherein the temperature related quality profile includes a change of state or a change in appearance of the one or more inks.

3. The print device according to claim 2, wherein the change in appearance comprises a change in color or quality of the one or more inks.

4. The print device according to claim 2, wherein the change in state comprises a change of a portion of the one or more inks melting due to exposure to a temperature above a predetermined temperature threshold.

5. The print device according to claim 1, wherein the controller is operable to instruct the print nozzles to print the one or more inks onto the label.

6. The print device according to claim 1, wherein the controller is operable to affix the label onto a package containing one or more items that are temperature-sensitive.

7. The print device according to claim 6, wherein the items comprise food or pharmaceutical products.

8. The print device according to claim 1, wherein the dispensing of the one or more inks is performed at an elevated temperature above a melting point of the ink.

9. The print device according to claim 1, wherein the ink comprises a wax or resin.

10. The print device according to claim 1, wherein the label comprises a substrate on which the ink is printed, wherein the substrate comprises an uncoated surface, a coated surface, a porous surface, or a non-porous surface.

11. The print device according to claim 1, wherein:
    the first nonsensical ink pattern comprises letters printed on the first side of the label;

the second nonsensical ink pattern comprises letters printed in mirror image on the second side of the label; and the first nonsensical ink pattern and the second nonsensical ink pattern interleave to combine and form a readable message subsequent to the label reaching the temperature.

* * * * *